(12) United States Patent
Dowens

(10) Patent No.: US 6,314,171 B1
(45) Date of Patent: *Nov. 6, 2001

(54) METHOD AND APPARATUS FOR EXTENDING A PRE-PAID CALLING CARD LIMIT

(75) Inventor: Jac P. Dowens, Red Bank, NJ (US)

(73) Assignee: AT&T Corporation, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/570,931

(22) Filed: May 15, 2000

Related U.S. Application Data

(63) Continuation of application No. 09/067,654, filed on Apr. 27, 1998.

(51) Int. Cl.[7] ..................................................... H04M 17/00
(52) U.S. Cl. ............... 379/144.01; 379/111; 379/112.01; 379/114.01; 379/114.15; 379/114.2
(58) Field of Search ................................ 379/111–115.02, 379/121, 127, 130–133, 134, 188–189, 196–197, 199–200, 355, 356, 359, 121.01–121.05, 127.01–127.05, 144.01; 455/406–411

(56) References Cited

U.S. PATENT DOCUMENTS

| | | |
|---|---|---|
| 3,591,723 | 7/1971 | Dal Monte . |
| 3,657,482 | 4/1972 | Dal Monte . |
| 3,852,571 | 12/1974 | Hall et al. . |
| 4,031,324 | 6/1977 | Dudonis . |
| 4,122,308 | 10/1978 | Weinberger et al. . |
| 4,410,765 | 10/1983 | Hestad et al. . |
| 4,518,824 | 5/1985 | Mondardini . |
| 4,706,275 | 11/1987 | Kamil . |
| 4,897,870 | 1/1990 | Golden . |
| 5,353,335 | 10/1994 | D'Urso et al. . |
| 5,359,642 | 10/1994 | Castro . |

(List continued on next page.)

FOREIGN PATENT DOCUMENTS

| | | |
|---|---|---|
| 460 417 | 9/1968 | (CH) . |
| 3401319 A1 | 7/1985 | (DE) . |
| 1 526 869 | 10/1978 | (GB) . |
| 1 544 542 | 4/1979 | (GB) . |
| 2 046 556 | 11/1980 | (GB) . |
| 2 141 309 | 12/1984 | (GB) . |

OTHER PUBLICATIONS

Turbat, Alain et al., Memory Card: The Irresistible Upsurge, Telecommunications 51, Apr. 1984, pp. 59–64.

Kaihara, Masaharu, et al., Magnetic Card Public Telephone, Review of the Electrical Communication Laboratories, vol. 32, No. 1, 1984, pp. 49–53.

Higashiyama, Fukuo, et al., Credit Call Service, Japan Telecommunications Review, Oct. 1980, pp. 308–310.

Shimizu, Hiroshi, Advanced Credit Call Service, JTR, Oct. 1986, pp. 247–250.

Shimizu, Hiroshi, et al., Advanced Free Dial Service, JTR, Jul. 1987, pp. 15–18.

Primary Examiner—Duc Nguyen
(74) Attorney, Agent, or Firm—Oliff & Berridge, PLC

(57) ABSTRACT

The invention provides a system and method for extending a limit of a pre-paid calling card without disconnecting the communicating parties. When a first party makes a call using a pre-paid calling card and the limit of the calling card is reached, a call extender either queries the called party or launches a call to another party to query if these parties would pay for the remainder of the call or whether the parties would pay for extending the limit by an agreed amount. If a party agrees to pay for one of the above options, the call extender permits the call to continue and bills the accepting party accordingly.

20 Claims, 5 Drawing Sheets

U.S. PATENT DOCUMENTS

| | | |
|---|---|---|
| 5,381,467 | 1/1995 | Rosinski et al. . |
| 5,502,759 * | 3/1996 | Cheng et al. ............................ 379/88 |
| 5,754,633 * | 5/1998 | Levy . |
| 5,822,411 | 10/1998 | Swale et al. . |
| 5,825,863 * | 10/1998 | Walker ................................. 379/144 |
| 5,909,486 | 6/1999 | Walker et al. . |
| 6,122,354 * | 9/2000 | Dowens ................................ 379/144 |
| 6,226,364 * | 5/2001 | O'Neil . |
| 6,226,366 * | 5/2001 | Bala et al. . |

\* cited by examiner

| 306 | 308 | 310 | 312 | 314 |
|---|---|---|---|---|
| CARD NAME | TYPE | AMOUNT REMAINING | EXTENSION PREFERENCE | BILLING DATA |
| ↑ 302 | ↑ 304 | ... | | |

METHOD AND APPARATUS FOR EXTENDING A PRE-PAID CALLING CARD LIMIT

This application is a continuation of application Ser. No. 09/067,654, filed Apr. 27, 1998.

BACKGROUND OF THE INVENTION

1. Field of Invention

The invention provides a device and method for extending a pre-paid calling card limit.

2. Description of Related Art

Pre-paid calling cards may be purchased for preset amounts such as increments of $10, $20 and $50, for example. The pre-paid calling card may be used for telephone calls to a called party for a certain number of minutes up to a limit corresponding to the dollar amount of the card, for example. Conventionally, when the limit is reached during a call, the call is terminated immediately and the caller must purchase additional pre-paid calling card time to again call the called party. The above sequence of events is very inconvenient and undesirable. Thus, new technology is required to avoid the above undesirable circumstances.

SUMMARY OF THE INVENTION

The invention provides a system and method for extending a limit of a pre-paid calling card without disconnecting the communicating parties. When a calling party makes a call using the pre-paid calling card and the limit of the calling card is reached, a call extender queries another party which could be the called party, other parties or the calling party to obtain an account number to pay for the remainder of the call or to extend the limit by an agreed amount. If one of the parties agrees to pay, the call extender permits the call to continue and bills the accepting party accordingly.

BRIEF DESCRIPTION OF THE DRAWINGS

The preferred embodiments of this invention are described with reference to the following figures, wherein like numerals represent like elements, and wherein:

FIG. 3 is a diagram of a database used by the calling card extender;

DETAILED DESCRIPTION OF PREFERRED EMBODIMENTS

Figure 1:
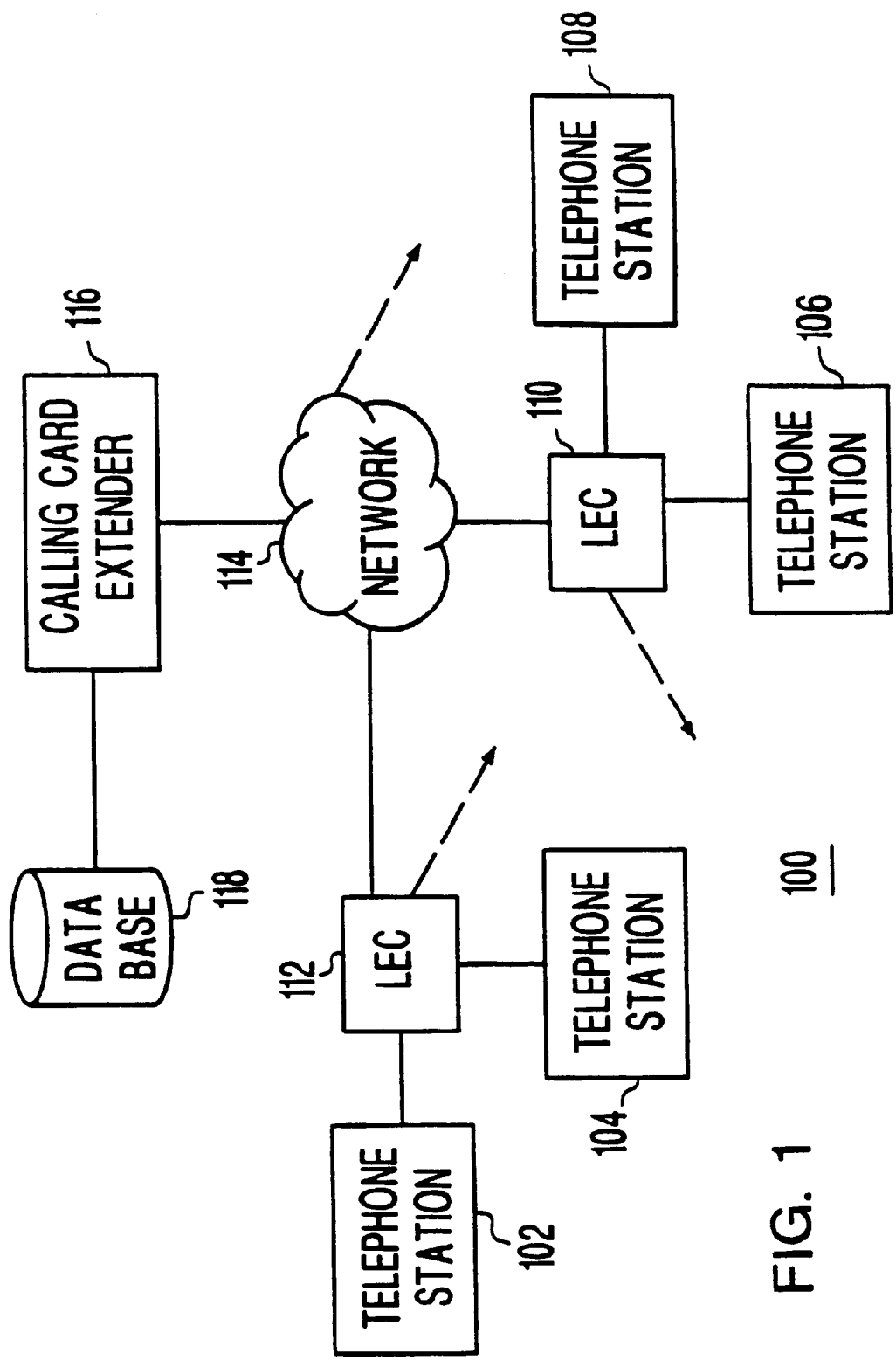
FIG. 1 is a diagram of a pre-paid calling card extender system.

FIG. 1 shows a calling card extender system 100 that includes telephone stations 102–108 coupled to a network 114 through local exchange carriers (LEC) 110 and 112. Also coupled to the network is a calling card extender 116. While FIG. 1 shows the calling card extender 116 as a centralized system, all the functions of the calling card extender 116 may be performed by distributed units such as the LEC 110 and 112. However, for ease of discussion, the following description assumes that the calling card extender 116 is centralized as shown in FIG. 1.

While the database 118 is shown in FIG. 1 to be connected directly to the calling card extender 116, the database 118 may be physically located anywhere in the network 114. The following description assumes that the data related to the pre-paid calling card is stored in the databse 118.

When a calling party at the telephone station 102 makes a call to a called party using a pre-paid calling card by dialing an 800 number and entering the pre-paid calling card number, for example, the call is routed through the LEC 112 and the network 114 to the calling card extender 116. The calling card extender 116 retrieves calling card data from a database 118 based on the pre-paid calling card number to confirm that the pre-paid calling card is valid and that a limit associated with the pre-paid calling card has not been reached. If the limit has not been reached, the calling card extender 116 connects the call to the called party at the telephone station 108, for example.

After the call is connected, the calling card extender 116 continues to monitor the call to detect if the limit associated with the pre-paid calling card is reached. For example, if the pre-paid calling card has ten minutes of calling time remaining, the calling card extender 116 monitors the call until the ten-minute limit is reached. When reached, instead of disconnecting the call, the calling card extender 116 attempts to extend the limit by querying the calling party, the called party, or another party whether they are willing to accept charges to extend the limit of the pre-paid calling card.

Figure 2:
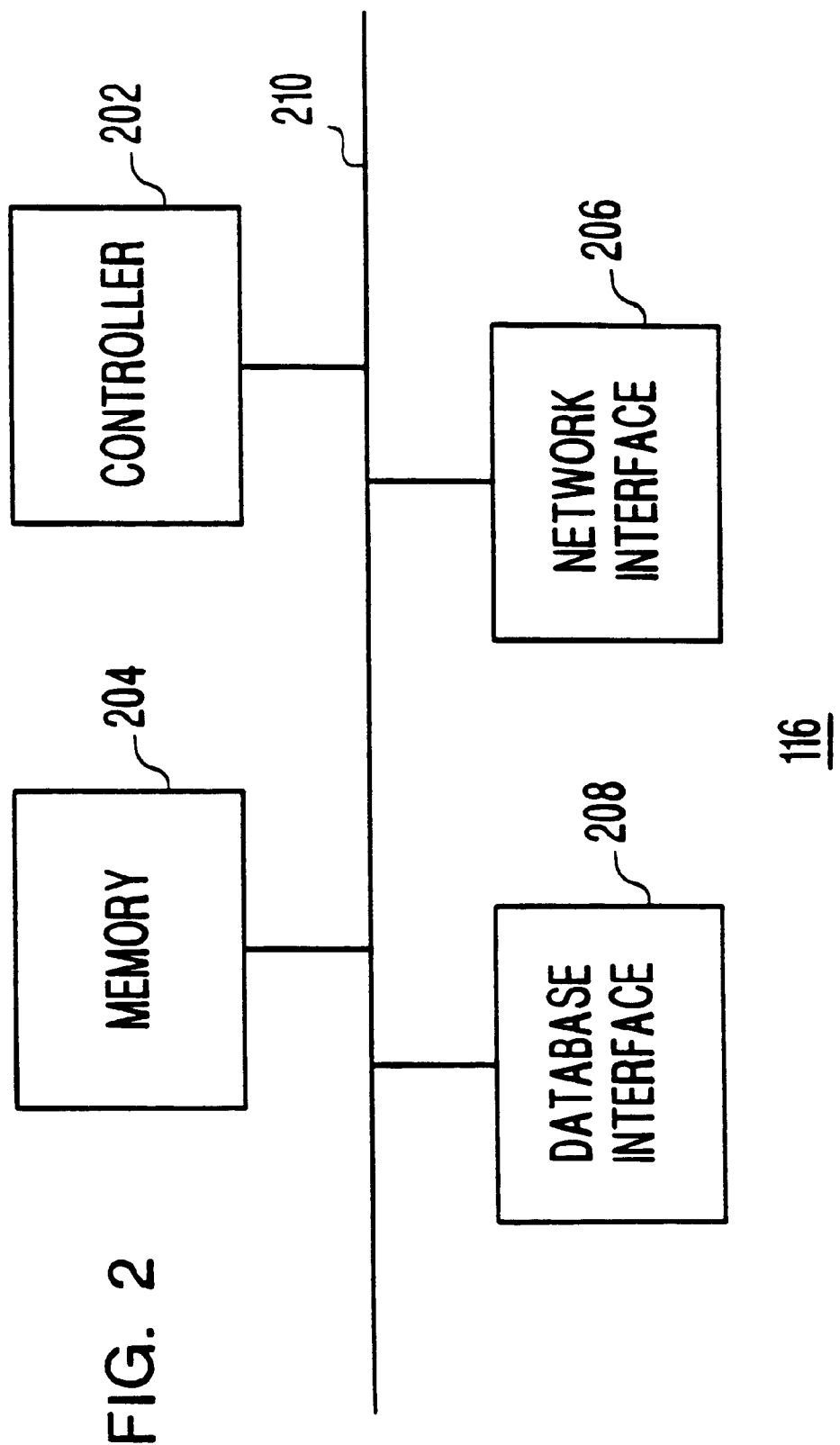
FIG. 2 is a block diagram of a calling card extender.

FIG. 2 shows a block diagram of the calling card extender 116. The calling card extender 116 includes a controller 202, a memory 204, a database interface 208 and a network interface 206. The above components are coupled via a signal bus 210.

When the controller 202 receives a pre-paid calling card call through the network interface 206, the controller 202 retrieves calling card data associated with the pre-paid calling card from either the memory 204 or the database 118 through the database interface 208 based on the pre-paid calling card number. The controller 202 may verify that the calling card number is valid and check whether the limit value of the calling card has not been reached or exceeded. If the above checks are satisfied (i.e., card valid and limit not reached), the controller 202 initializes a current consumption value and updates the current consumption value as the pre-paid calling card call progresses based on the calling card data as described below.

Figure 3:
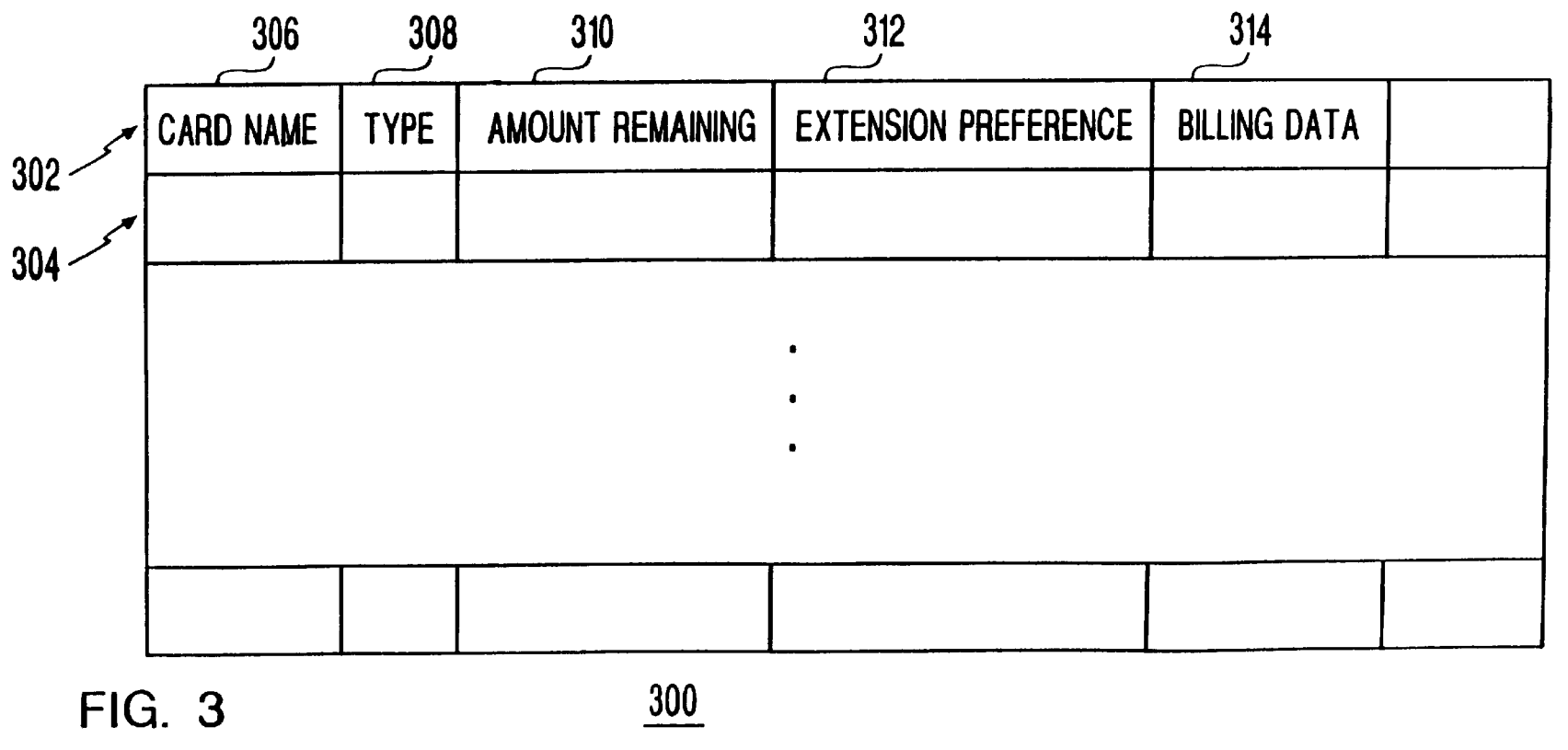

FIG. 3 shows calling card data 300 stored in the database 118. The calling card data contains entries 302, 304 for each of the pre-paid calling cards of subscribers. Each of the calling card entries 302, 304 includes a calling card number field 306, a type field 308, an amount remaining field 310, and an extension preferences field 312, for example. The calling card number field 306 identifies the calling card by the pre-paid calling card number for example. The type field 308 may indicate the type of limit associated with the pre-paid calling card. For example, the pre-paid calling card may be a fixed dollar amount calling card. For such a calling card, the amount remaining field 310 may be a dollar amount remaining for the pre-paid calling card. If telephone charges are 10¢ per minute and the pre-paid calling card has $10 remaining then charges for calls are deducted from the amount remaining field 310 until the amount remaining field 310 reaches zero. At this point, either another pre-paid calling card is purchased or an additional dollar amount may be purchased using the same pre-paid calling card.

If the type field 308 indicates a time calling card, then the amount remaining field 310 includes a time remaining regardless of the cost. For this type of pre-paid calling card, an optional billing data field 314 is added for billing a designated party for the cost relating to the amount of time consumed using the pre-paid calling card.

This type of pre-paid calling card provides the subscriber freedom to make calls at different rates without having to compute the amount of time remaining for the pre-paid calling card. For example, a parent may purchase such a pre-paid calling card for a college student and limit the number of minutes that may be consumed using the pre-paid calling card. The billing data field 314 directs the bill to the parent to pay for the minutes consumed by the pre-paid calling card.

The type field may also indicate a date calling card. For this type of calling card, a schedule of valid dates is specified when charges for calls are covered by the calling card. For example, if a subscriber takes a vacation and purchases a calling card only for the vacation days. This way, if the card is misplaced after the vacation or lost during the vacation, the potential liability is reduced if not eliminated. If the vacation is extended, then the subscriber may extend the calling card limit via the calling card extender 116.

The extension preferences field 312 includes identification of parties that may accept payment for extending the limit of the pre-paid calling card. For example, the extension preferences field 312 may include the calling party, the called party, or other parties that may be willing to pay for the charges required either to complete a call or to firer extend the limit of the pre-paid calling card.

For example, if a parent purchased the pre-paid calling card for the college student to call home and the limit is exceeded during a call, the parent may be willing to pay for a remaining duration of the call or to further extend the limit of the pre-paid calling card. Thus, while engaged in a conversation with the college student and the amount indicated in the amount remaining field 310 is reached, the parent may wish to approve completing the call and pay for the required extension or to extend the limit of the pre-paid calling card by an agreed amount such as an hour.

If the pre-paid calling card is used by a business person traveling overseas and the pre-paid calling card limit is reached while engaged in a conversation with a client, the businessperson may not wish for the client to be queried whether to pay for the remaining conversation. The businessperson may wish to have the opportunity to charge the call to a company account number or request another party to pay for the call. Thus, the extension preferences field 312 may include the businessperson's home office telephone number so that the home office may be contacted to approve further extension of the limit of the pre-paid calling card Thus, the extension preferences field 312 may contain a list of parties identified by their respective numbers such as telephone numbers, so that these parties may be contacted when necessary to extend the limit of a pre-paid calling card.

The list of parties in the extension preferences field 312 may be ordered in a priority order. For example, the businessperson may prefer to be queried first, the home office be queried second, perhaps his home telephone queried third, and then, as a last resort, query the called party.

Returning to FIG. 2, when the limit of the pre-paid calling card has been reached, the controller 202 retrieves from the database 118 the extension preferences field 312 and generates a message that is appropriate for the highest priority party to be contacted. For example, if the highest priority party to be contacted is the called party, the message may be: "Would you be willing to accept the charges for the remainder of this call. If you accept charges please press one." If the called party accepts the charges by pressing one (or any other method known in the art such as a voice command), the controller 202 permits the call to continue and bills the called party's telephone number for the cost of the remainder portion of the call.

If the calling party in the extension preferences field 312 is a home office number, the controller 202 may launch a call to the home office number through the network interface 206. If the call is answered, the controller 202 may output a message such as: "Please indicate whether you accept charges for extending the limit for calling card number ##### for Mr. Businessperson by pressing one followed by the number of minutes to extend the limit." Assuming that the operator of the home office has received prior instructions, the pre-paid calling card for Mr. Businessperson would be extended when necessary. Upon receiving acceptance, the controller 202 updates the amount remaining field 310 by the amount entered by the home office operator and then permits the call to continue.

If either the home office operator fails to accept the charges or the call is not answered, the controller 202 proceeds to the next party identified in the extension preferences field 312 and launches a call to that party. The sequence continues until the list of parties in the extension preferences field 312 is exhausted. If none of the parties contacted answer the call or no one contacted accepts the charges, the call is disconnected. If the charges are accepted by one of the contacted parties, the controller 202 either updates the amount remaining field 310 to extend the limit or remembers that the accepting party is paying for the remainder of the call and updates the billing data field 314 to ensure that proper billing is achieved.

In all the above examples for extending the limit value, the limit value may be extended any number of times during a single call. Thus, if the party contacted first is willing to extend the call only for a small amount, another party may be contacted to further extend the limit value.

Figure 4:
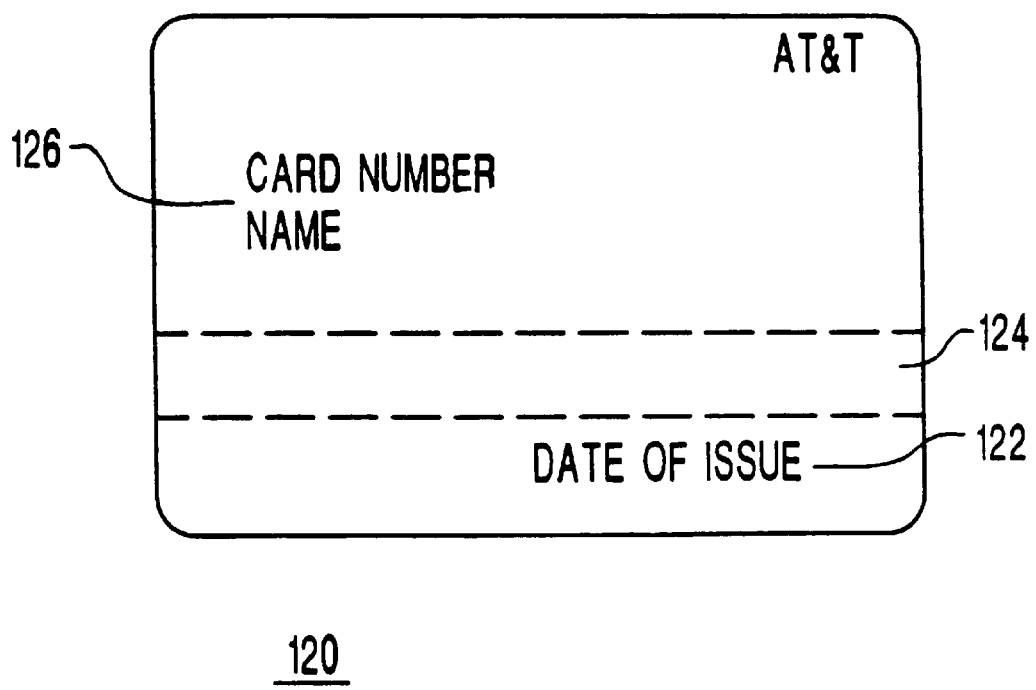
FIG. 4 is a diagram of a calling card.

FIG. 4 shows an example of a calling card 120 having an identification 126 that may include a card number and name, a date of issue 122 and a magnetic strip 124 on the backside of the card 120. When a subscriber makes a pre-paid calling card call, the card number may be entered to identify the pre-paid calling card and to allow the call extender 116 to retrieve pre-paid calling card information from the database 118. When available, a device may be coupled to the telephone station 102 used by the subsciber that may read and/or write to and from the magnetic strip 124, for example. In this case, the subscriber may simply insert the pre-paid calling card 120 in the device to enter the pre-paid calling card number when making a call.

For the card 120, the magnetic strip 124 may serve as the database 118 and store all the information needed for the calling card extender 116 to process the pre-paid calling card. Thus, when the limit of the pre-paid calling card is extended, the calling card extender 116 may write onto the magnetic strip 124 in the amount remaining field 310 the extended limit of the pre-paid calling card.

Figure 5:
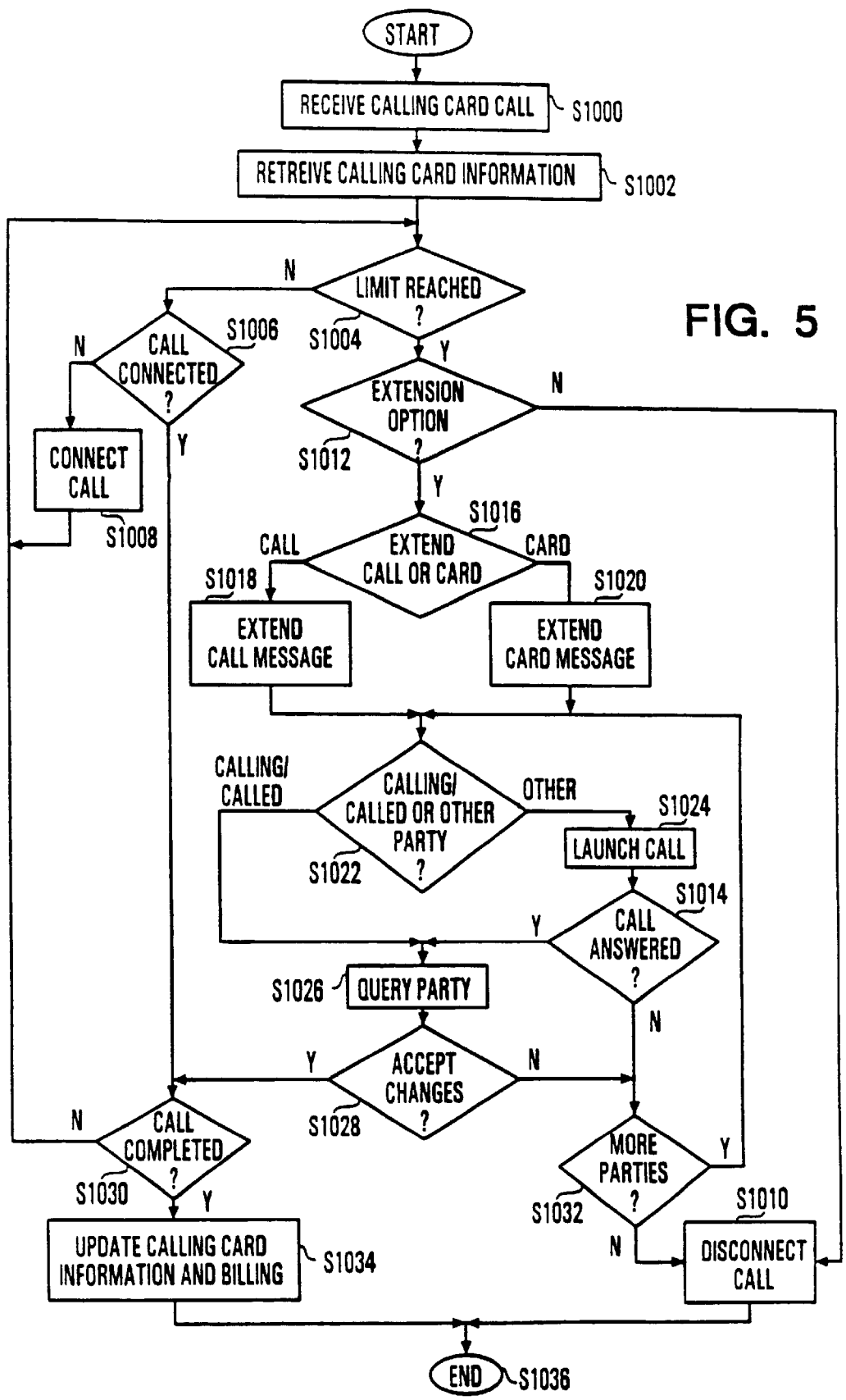
FIG. 5 shows a flow chart of a process of the calling card extender.

FIG. 5 shows a flow chart of a process of the calling card extender 116. In step S1000, the controller 202 receives a calling card call and goes to step S1002. In step S1002, the controller 202 retrieves the calling card information from the database 118 (or either from the memory 204 or from the magnetic strip 124) and goes to step S1004. In step S1004, the controller 202 retrieves the amount remaining field 310 and determines whether a limit of the pre-paid calling card has been reached. If the limit has been reached, the controller 202 goes to step S1012; otherwise, the controller goes to step S1006. In step S1006, the controller 202 determines whether the calling card call has been connected to the called party. If the call has not been connected, the controller 202 goes to step S1008; otherwise, the controller goes to step S1030. In step S1008, the calling card extender 116 connects the call to the called party and returns to step S1004.

In step S1012, the calling card extender 116 determines whether the pre-paid calling card has the extension option enabled. If enabled, the calling card extender 116 goes to step S1014; otherwise, the calling card extender goes to step S1010. In step S1014, the calling card extender queries the caller whether extending the expired limit of the pre-paid calling card is desired. If desired, the calling card extender 116 goes to step S1016; otherwise, the calling card extender 116 goes to step S1010. In step S1016, the calling card extender determines whether the extension is desired to extend only the current call or to extend the limit independent of the current call. If the limit is to be extended only to cover the current call, the calling card extender 116 goes to step S1018; otherwise, the calling card extender 116 goes to step S1020. In step S1018, the calling card extender 116 generates a message that only requests coverage of the current call and goes to step S1022. In step S1020, the calling card extender 116 generates a message to request extension of the limit of the pre-paid calling card and goes to step S1022.

In step S1022, the calling card extender 116 retrieves the information in the extension preferences field 312 and determines whether the calling/called party or other parties are to be contacted. If the calling/called party is to be contacted, the controller 202 goes to step S1026; otherwise, the controller 202 goes to step S1024. In step S1026, the controller 202 outputs the generated message as a query to either the calling or the called party and goes to step S1028. In step S1024, the controller 202 launches a call to the other party and goes to step S1014. In step S1014, the controller 202 determines whether the call is answered If answered, the controller 202 goes to step S1026; otherwise, the controller goes to step S1032.

In step S1028, the controller determines whether the queried party accepts the charges for extending the limit. If accepted, the controller 202 goes to step S1030; otherwise, the controller goes to step S1032. In step S1030, the controller 202 updates the billing data field 314 and monitors the call to determine whether the call is completed. If completed, the controller 202 goes to step S1034; otherwise, the controller 202 returns to step S1004. In step S1034, the controller updates the databse 118 for the calling card by recording the appropriate billing information as well as adjusting the amount remaining field 310 and goes to step S1036 and ends the process.

In step S1032, the controller 202 determines whether there are more parties in the extension preferences field 312 that have not been contacted. If there are more parties, the controller 202 returns to step S1022; otherwise, the controller goes to step S1010. Instep S1010, the controller 202 disconnects the call, goes to step S1036, and ends the process.

While this invention has been described in conjunction with specific embodiments thereof, it is evident that many alternatives, modifications and variations will be apparent to those skilled in the art. Accordingly, preferred embodiments of the invention as set forth herein are intended to be illustrative not limiting. Various changes may be made without departing from the spirit and scope of the invention.

What is claimed is:

1. A method for extending a limit value of a pre-paid calling card during a first call by a first party to a second party, comprising:

detecting whether the limit value of the pre-paid calling card is reached;

outputting a query to a third party different from the first and second parties to determine whether the third party would accept charges for extending the limit value if the limit value is reached; and extending the limit value if the third party accepts the charges.

2. The method of claim 1, wherein the detecting step comprises:

retrieving the limit value of the pre-paid calling card from a database;

initializing a current consumption value of the pre-paid calling card;

updating the current consumption value as the first call progresses; and determining whether the limit value is reached based on updated current consumption value.

3. The method of claim 2, further comprising interpreting the limit and the current consumption values based on a type value retrieved from the database, the type value indicating that the limit and the current consumption values are at least one of a time value, a date value, and a cost value.

4. The method of claim 1, wherein the outputting step comprises:

retrieving an identification list of at least one identification of the third party from the database;

generating a message based on the identification of the third party; and outputting the message to the third party as the query.

5. The method of claim 4, further comprising:

launching a second call to the third party; and outputting the message to,the third party if the third call is answered.

6. The method of claim 5, further comprising:

launching additional calls to other third parties identified in the identification list if either the second call is not answered or the third party does not accept the charges; and outputting the message to any one of the other third parties that answers one of the additional calls.

7. The method of claim 6, further comprising disconnecting the first call if either none of the identified third parties in the identification list answers either the second call or one of the additional calls, or if none of the third parties accepts the charges.

8. The method of claim 4, wherein the at least one identification of the third party is ordered in a priority order.

9. The method of claim 1, wherein the charges include payment for completing the first call, the extending step comprising:

permitting the first call to continue until completed if the charges include completing the first call; and billing the third party for a cost corresponding to an amount that the first call exceeded the limit.

10. The method of claim 1, wherein the charges include payment for changing the limit value to an agreed amount, the extending step comprising:

changing the limit value to an extended limit value;

permitting the first call to continue until the extended limit value is reached;

outputting another query to the third party to determine whether the third party accepts further charges for extending the extended limit value if the extended limit value is reached; and extending the extended limit value if the third party accepts the further charges.

11. A calling card extender that extends a limit value of a pre-paid calling card during a first call by a first party to a second party, comprising:
   a memory;
   a controller coupled to the memory, wherein the controller detects whether the limit value of the pre-paid calling card is reached, outputs a query to a third party different from the first and second parties to determine whether the third party would accept charges for extending the limit value if the limit value is reached, and extends the limit value if the third party accepts the charges.

12. The extender of claim 11, wherein the controller retrieves the limit value of the pre-paid calling card from a database, initializes a current consumption value of the pre-paid calling card, updates the current consumption value as the first call progresses, and determines whether the limit value is reached based on updated current consumption value.

13. The extender of claim 12, wherein the controller interprets the limit and the current consumption values based on a type value retrieved from the database, the type value indicating that the limit and the current consumption values are at least one of a time value, a date value, and a cost value.

14. The extender of claim 11, wherein the controller retrieves an identification list of at least one identification of the third party from the database, generates a message based on the identification of the third party, and outputs the message to the third party as the query.

15. The extender of claim 14, wherein the controller launches a second call to the third party and outputs the message to the third party if the second call is answered.

16. The extender of claim 15, wherein the controller launches additional calls to other third parties identified in the identification list if either the second call is not answered or the third party does not accept the charges, and outputs the message to any one of the other third parties that answers one of the additional calls.

17. The extender of claim 16, wherein the controller disconnects the first call if either none of the identified third parties in the identification list answers either the second call or one of the additional calls, or if none of the third parties accepts the charges.

18. The extender of claim 14, wherein the at least one identification of the third party is ordered in a priority order.

19. The extender of claim 11, wherein the charges include payment for completing the first call, the controller permitting the first call to continue until completed if the charges include completing the first call, and billing the third party for a cost corresponding to an amount that the first call exceeded the limit.

20. The extender of claim 11, wherein the charges include payment for changing the limit value to an agreed amount, the controller changing the limit value to an extended limit value, permitting the first call to continue until the extended limit value is reached, outputting another query to the third party to determine whether the third party accepts further charges for extending the extended limit value if the extended limit value is reached, and extending the extended limit value if the third party accepts the further charges.

* * * * *